Patented June 8, 1948

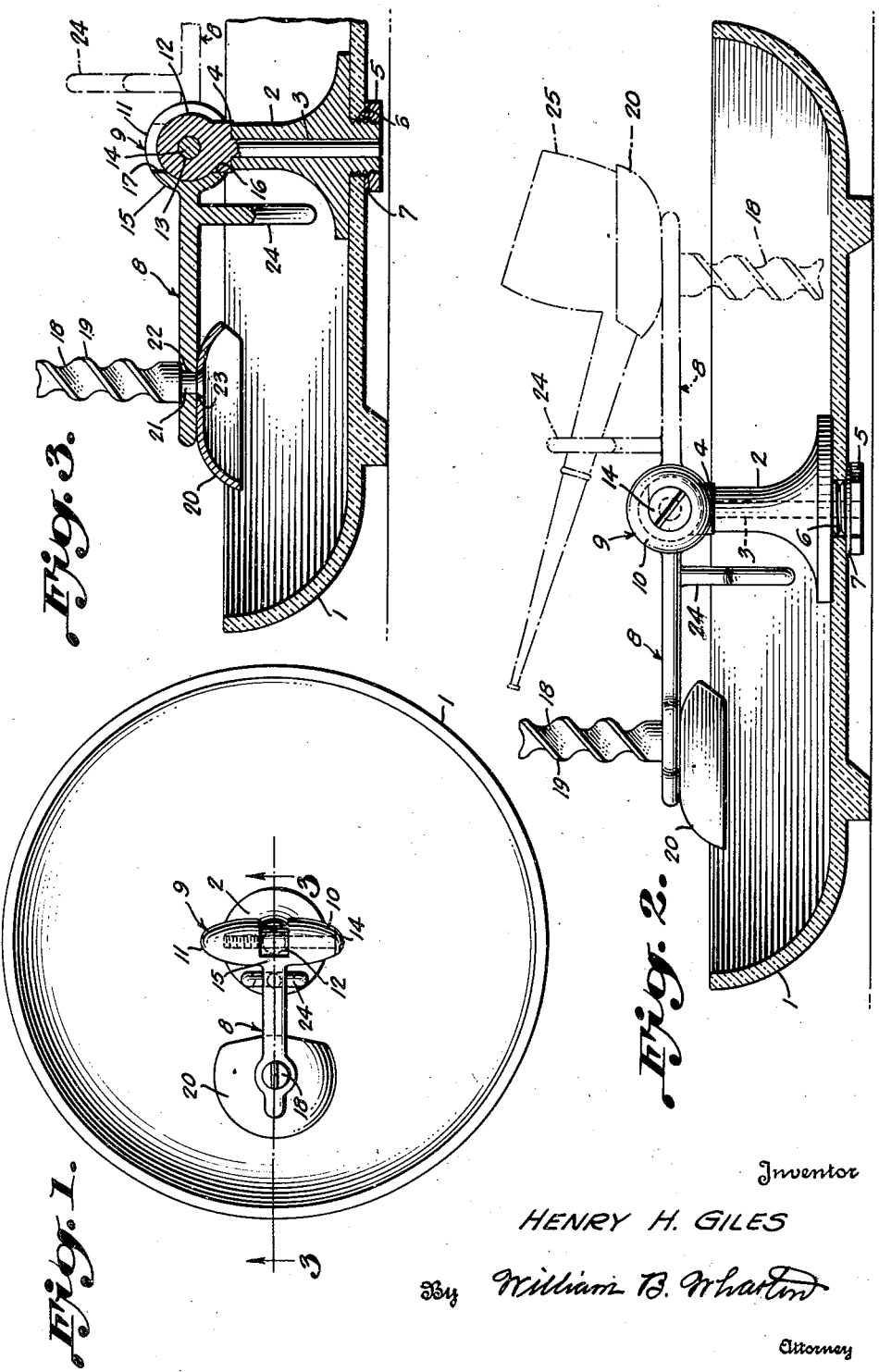

2,442,923

UNITED STATES PATENT OFFICE 2,442,923

PIPE REAMER AND REST

Henry H. Giles, Pittsburgh, Pa.

Application February 27, 1947, Serial No. 731,375

6 Claims. (Cl. 131—232)

This invention relates to a combined mechanical reamer and pipe rest for tobacco pipes.

The object of the invention is to provide a combined pipe reamer and pipe rest, which, in one position, gives a mechanical reaming action in the bowl of the pipe, with a minimum of mechanical parts and with simplicity of mechanical structure, while performing its intended function under the influence of a simple and easy manual operation, and which, in a second position, provides a support or rest for the pipe.

Another and conjoint object is to provide a combined pipe reamer and pipe rest of the designated sort which comprises means for receiving ashes, dottle and crust removed from the bowl of a pipe, and which assembly is as a whole of pleasing appearance.

Another object of the invention is to provide a combined pipe reamer and pipe rest of the designated sort which comprises a supporting arm or member pivotally mounted for movement about both horizontal and vertical axes, the opposite sides of said supporting member carrying a reaming tool and pipe supporting means, respectively.

In the accompanying drawing illustrative of my invention:

Fig. 1 is a plan view of a combined pipe reamer and pipe rest constituting a simple embodiment of my invention.

Fig. 2 is a vertical sectional view through the ash receptacle showing the combined pipe reamer and pipe rest assembly, in side elevation; and Fig. 3 is a vertical sectional view through the pipe reamer and pipe rest taken in the plane of the line 3—3 of Fig. 1.

In the accompanying drawings, reference numeral 1 designates a relatively deep dish, which serves as a mounting base for the mechanical elements of the combined reamer and rest and as a receiver for ashes and dottle from tobacco pipes in the bowls of which the reamer acts. Secured in the bottom of dish 1 there is an upright post 2, which desirably is mounted centrally of the dish as shown, and which houses a readily removable swivel pin or spindle 3 of a swivel hinge 4. Convenient means for mounting post 2 in dish 1 are shown as a nut 5 on a threaded extension 6 of post 2 and bearing against a washer 7 on the under surface of the dish.

A normally horizontal tool and pipe rest supporting arm or member 8 is hingedly connected at one end thereof to the swivel hinge 4. As shown, the supporting arm 8 has a bifurcated end portion 9 comprising arms 10 and 11 adapted to receive therebetween the head portion 12 of the swivel hinge 4.

The head 12 of the swivel hinge 4 is provided with a horizontal bore 13 and a screw 14 extends through the arm 10, the bore 13, and into the arm 11 to hingedly mount the arm 8 for movement about a horizontal axis. Movement of the arm 8 about a horizontal axis is limited to substantially 180 degrees and the said arm is normally maintained in a substantially horizontal position on either side of the swivel hinge 4, by having the connection 15 between the arms 10 and 11 extend from opposite sides of the arm 8, to a point such that the edge 16 or the edge 17 thereof engages the lower portion of the head 12 of the swivel hinge 4 when the arm 8 reaches a horizontal position. The pin or spindle 3 of the swivel 4 provides means whereby the supporting arm 8 may be rotated about a vertical axis.

The reaming tool is of a form usual in pipe reamers, desirably having a double cutting thread 19. This reaming tool 18 is non-rotatably mounted on one side of the supporting arm 8 in a position substantially removed from the vertical pivot provided by the spindle 3. This eccentric mounting is such as to cause reaming tool 18 to move through a circular path of substantial radius when carrying arm 8 is rotated.

A substantially cup-shaped pipe bowl supporting member 20 is rigidly mounted on the supporting arm 8 on the side thereof opposite the tool 18. If desired, a projection or boss 21 on the tool 18 may be extended through suitable openings 22 and 23 in the arm 8 and member 20, respectively, and riveted to securely fasten the tool 18 and member 20 to the arm 8. Spaced inwardly from the member 20, the arm 8 is also provided with a yoke-shaped pipe stem support 24. The members 20 and 24 provide a rest or supporting means for a pipe 25 when the arm 8 is rotated about its horizontal axis provided by the screw 14 to the broken line position indicated in Figs. 2 and 3.

In use of the reamer, the arm 8 is positioned as indicated by the solid lines in Figs. 1 and 2, and the bowl of a pipe is placed in an inverted position on reaming tool 18 so that the tool enters or tends to enter the cavity of the bowl. The stem of the pipe being firmly held by the user, he provides a simple crank motion by movement of his own arm to produce rotation of the tool-carrying arm 8 about its vertical axis, provided by the spindle 3, by contact of the pipe bowl with the tool. The pipe being held firmly, there is then a single complete relative revolution of the reaming tool and the pipe bowl for each revolution of the tool-carrying arm. As this action proceeds the reaming tool dislodges dottle from the pipe bowl, and may scrape the crust surrounding the cavity in the bowl to limit the thickness of such crust. Particles of dislodged dottle and scraped crust, together with any ashes which may be in the pipe bowl, fall into dish 1.

It will readily be understood that the reaming action on the bowl of a tobacco pipe performed by my reamer assembly is particularly advantageous both from the operative and the structural viewpoint. On one hand it gives the desired relative rotation between the pipe bowl and the reaming tool without the awkward physical movement on the part of the user which is required if the bowl of a tobacco pipe is rotated on a stationary reaming tool. On the other hand, the simple structure involved in the rotatable mounting of the reaming tool avoids the tendency to early mechanical failure which may be met if complex power-transmitting elements be included in a device of this sort.

In use of my device as a pipe rest, it is only necessary to move the supporting arm 8 from the position indicated by the solid lines, to the position indicated by the broken lines in Figs. 2 and 3. In this latter position, the members 20 and 24 provide a rest or supporting means for the pipe 25 as illustrated in Fig. 2. It will be obvious, of course, that the arm 8 may be rotated about its vertical axis provided by the spindle 3 to move the pipe 25 to any desired position.

It may be explained that the structure of the combined pipe reamer and pipe rest assembly may be primarily or wholly of metal in accordance with the implications of the foregoing description and drawings. It is, however, possible that all elements of the structure may be made of suitable non-metallic material such as molded plastic, with such change in the detailed structure of the assembly as the use of such alternative material will indicate.

Having illustrated an exemplary embodiment of my invention, I wish it to be understood that various modifications in form and arrangement may be made while remaining within the bounds of my invention as defined in the claims appended hereto.

Suggested modifications of the supporting arm and ash receptacle may be found in my copending application Serial No. 708,110, filed November 6, 1946, in which certain of the subject matter disclosed herein is claimed. The said copending application is a continuation-in-part of my application Serial No. 570,544, filed December 30, 1944, now abandoned.

I claim as my invention:

1. A combined pipe-reamer and pipe-rest assembly comprising an upwardly open receptacle, a pivot post supported by and extending upwardly in said receptacle, a supporting member normally horizontally extending from and rotatable with respect to said post about horizontal and vertical axes, a reaming tool carried non-rotatably by and relative to said supporting member on one side thereof in a position removed from the center of rotation of the said supporting member and within the horizontal bounds of the receptacle, so that crank motion applied to the said reaming tool through the bowl of a pipe causes the tool to move circularly about the pivot post with relative movement between the tool and the pipe bowl to remove from the latter refuse which falls into the receptacle, and means including a pipe-supporting element positioned on the side of said supporting member opposite said reaming tool for securing said reaming tool to said supporting member.

2. A pipe-reamer assembly in accordance with the statement of claim 1 in which the rotatable supporting member is in the form of an extended arm.

3. A combined cleaner and rest for a pipe comprising a supporting member rotatable about horizintal and vertical axes, a reaming tool carried non-rotatably by and relative to said supporting member on one side thereof, means including a pipe-supporting element positioned on the side of said supporting member opposite said reaming tool for securing said reaming tool to said supporting member, and means for mounting the supporting member and reaming tool on an ash receptacle so that the reaming tool is in offset relation to the vertical axis of rotation of the supporting member and in such relation to the ash receptacle as to locate all portions of the reaming tool within the horizontal bounds of the receptacle, said supporting member being rotatable about said vertical axis by moving a pipe bowl against said tool with the tool mounted in the cavity of the pipe bowl.

4. A pipe-reamer and pipe-rest assembly comprising an upwardly opening receptacle, means comprising a supporting member supported by said receptacle, means for rotatably mounting said supporting member about axes at right angles to each other, a reaming tool carried non-rotatably by and relative to said supporting member on one side thereof in a position removed from the center of rotation of said supporting member, so that crank motion applied to the said reaming tool through the bowl of a pipe causes the tool to move circularly with relative movement between the tool and the pipe bowl to remove from the latter refuse which falls into the receptacle, means including a pipe-supporting element positioned on the side of said supporting member opposite said reaming tool for securing said reaming tool to said supporting member, and a second pipe-supporting element on the same side of said supporting member as said first-mentioned pipe-supporting element.

5. A combined cleaner and rest for a pipe comprising a supporting member on a mounting base rotatable about axes at right angles to each other, a reaming tool carried non-rotatably by and relative to said supporting member on one side thereof, means including a pipe-supporting element positioned on the side of said supporting member opposite said reaming tool for securing said reaming tool to said supporting member, and means for mounting the supporting member and reaming tool so that the reaming tool is in offset relation to one of said axes of rotation of the supporting member, said supporting member being rotatable about said one of said axes by moving a pipe bowl against said tool with the tool mounted in the cavity of the pipe bowl and the said pipe-supporting means being brought into operative position by rotation of the said supporting member about an axis at right angles to the axis about which it rotates in its circular reaming movement.

6. A pipe-reamer and pipe-rest assembly comprising a mounting base, an upright pivot post supported by said mounting base, a supporting means normally horizontally extending from and rotatable about horizontal and vertical axes with respect to said post, a reaming tool carried non-rotatably by and relative to said supporting means on one side thereof in a position removed from the vertical axis of rotation of the said tool carrying means, so that crank motion applied to the said reaming tool through the bowl of a pipe causes the tool to move circularly about the pivot post with relative movement between the tool and the pipe bowl to remove refuse therefrom, and means including a pipe-supporting element positioned on the side of said supporting member opposite said reaming tool for securing said reaming tool to said supporting member.

HENRY H. GILES.

REFERENCES CITED

The following references are of record in the file of this patent:

UNITED STATES PATENTS

| Number | Name | Date |
| --- | --- | --- |
| 388,235 | Whitledge et al. | Aug. 21, 1888 |